(12) United States Patent
Via'

(10) Patent No.: US 6,354,702 B2
(45) Date of Patent: Mar. 12, 2002

(54) SUPPORT FOR AUXILIARY LENSES FOR USE WITH EYEGLASSES

(76) Inventor: Gianmarco Da Via', Piazza S. Vigilio, 10 - 32040 Domegge Di Cardore (BL) (IT)

(*) Notice: Subject to any disclaimer, the term of this patent is extended or adjusted under 35 U.S.C. 154(b) by 0 days.

(21) Appl. No.: 09/764,427

(22) Filed: Jan. 19, 2001

Related U.S. Application Data (60) Provisional application No. 60/188,018, filed on Mar. 9, 2000.

(30) Foreign Application Priority Data

Jan. 21, 2000 (IT) .......................... UD00A0007

(51) Int. Cl.⁷ .................................. G02C 9/00
(52) U.S. Cl. ........................ 351/47; 351/57; 351/124
(58) Field of Search ..................... 351/47, 57, 48, 351/58, 41, 124

(56) References Cited

U.S. PATENT DOCUMENTS 5,017,001 A * 5/1991 Kooketsu .................. 351/47
5,123,724 A * 6/1992 Salk ......................... 351/47
5,936,702 A 8/1999 Cheong ..................... 351/47

FOREIGN PATENT DOCUMENTS

| CH | 689/431 | 4/1999 |
| FR | 2768237 | 3/1999 |
| GB | 807/552 | 1/1959 |
| GB | 807552 | 1/1959 |
| WO | WO97/19384 | 5/1997 |
| WO | WO00/29899 | 5/2000 |

* cited by examiner

Primary Examiner—Hung Xuan Dang
(74) Attorney, Agent, or Firm—Finnegan, Henderson, Farabow, Garrett & Dunner, L.L.P.

(57) ABSTRACT

Support for auxiliary lenses (11) able to associate auxiliary lenses (11) with glasses (13) comprising a frame (20) supporting main lenses (14), for each of said auxiliary lenses (11) said support (10) comprising at least two attachment elements arranged along the edge of said lens (11), each of said attachment elements (16, 15) comprising at least a substantially U-shaped segment (16a), equipped with elastic means (22) to couple with a lens (11), at least the attachment elements (16) comprising a hook-shaped extension (16b) able to anchor itself to the frame (20) of the glasses (13).

19 Claims, 5 Drawing Sheets fig. 1 fig. 7 fig. 2 fig.3a  fig.3b fig.4a fig.4b fig.4c fig. 5a fig. 5b fig. 5c fig. 6a fig 6b fig. 6c fig. 6d fig. 6e fig. 6f fig. 6g fig.8 fig.9

SUPPORT FOR AUXILIARY LENSES FOR USE WITH EYEGLASSES

This application claims the benefit of U.S. Provisional Application No. 60/188,018, filed Mar. 9, 2000, and claims the right to priority based on Italian Application No. UD2000A000007, filed Jan. 21, 2000.

FIELD OF THE INVENTION

This invention concerns a support for auxiliary lenses, suitable to be attached to a glasses frame equipped with main lenses, in order to temporally associate a pair of additional lenses, for example sun lenses, with said main lenses.

The support according to the invention allows to assemble the auxiliary lenses securely and in such a manner as to allow a plurality of lenses, different in shape and size, to be coupled.

Moreover, the support does not require complex equipment to make it, and allows a personalized production able to satisfy the clients' specific requirements in an extremely short time and at very limited cost.

BACKGROUND OF THE INVENTION

The state of the art includes various attachment and support devices used to temporally associate a pair of auxiliary lenses, for example sun lenses, to a glasses frame. These devices generally consist of a support, or trunk, which substantially defines an auxiliary frame, with a precise and defined shape, and comprising a plurality of metal hooks welded thereto and arranged to anchor the auxiliary frame to the main frame of the glasses.

Producing a trunk of the type mentioned above entails preparing the equipment to shape and weld the metal wires, which requires a long time to prepare and work. Therefore, it is substantially impossible for producers of this accessory to satisfy clients' specific requirements in a short time and at reasonable cost. Moreover, with time, the metal hooks often do not have a sufficient grip, and repeated operations to assemble/dis-assemble them can progressively reduce the solidity of the hooks and cause them to bend or break.

Even if the hooks are covered with a protective material they can in any case scratch or damage the glasses frame to which they are applied.

Moreover, the welds with which the hooks are attached to the trunk, or with which the lenses are attached to the bridge, must be made with extreme care, so they are not visible and do not compromise the overall aesthetics of the glasses; this entails a further increase in the production costs.

Other solutions provide auxiliary attachment elements, such as screws, rivets, or similar, or use glues to couple the hooks with the relative lenses. These solutions entail a considerable and often unsustainable increase in production costs and times for the supports.

The present Applicant has devised and embodied this invention to overcome the shortcomings of the state of the art, and to obtain other advantages as will be shown hereafter.

SUMMARY OF THE INVENTION

The invention is set forth and characterized in the main claim, while the dependent claims describe other innovative characteristics of the invention.

The main purpose of the invention is to achieve a support for auxiliary lenses which does not require particular, complex and expensive production equipment, which will be easy and inexpensive to make and which can therefore be produced even in small, personalized quantities according to the clients' requests.

A further purpose is to achieve a support for lenses which can be adapted to every type of frame, which will considerably reduce the risk of scratches or damage to the frame on which it is applied, and which will remain substantially unchanged with time, always ensuring high reliability and grip.

The support for auxiliary lenses according to the invention comprises first attachment elements arranged on the periphery of each lens and suitable to anchor themselves to the glasses frame on which the lenses have to be applied.

In a preferential embodiment, the support also comprises at least a connection bridge which, by means of second attachment elements attached to the respective lenses, unites the two auxiliary lenses.

In one embodiment of the invention, the second attachment elements not only have the function of supporting the bridge and connecting it to the auxiliary lenses, but also of anchoring themselves to the glasses frame to couple said support for the auxiliary lenses to the glasses themselves.

In a preferential embodiment, for every auxiliary lens there is one of said first attachment elements and one of said second attachment elements, distanced from each other along the edge of the lens; the second element, associated with the bridge, is arranged on the upper part of the lens and the first element is arranged on the lower part thereof. Advantageously, said two attachment elements are displaced towards the outer side of the relative lens.

According to a variant, there are at least two of said first attachment elements for every lens, for example one in its lower part and one in its lateral or upper part.

The first and second attachment elements are made of at least partly elastic plastic material.

According to the invention, each of said first attachment elements consists of a segment with a section substantially shaped like an upside down U, able to attach itself to the respective auxiliary lens, and of a hook-type extension able to anchor itself elastically to the frame of the glasses on which the auxiliary lenses are applied.

The upside down U segment, according to the invention, has elastic means able to be inserted and mechanically clamped inside a mating cavity made in the lens, ensuring that the auxiliary lenses are clamped securely, stably and enduringly, and preventing any risk of the segment accidentally coming out.

The second attachment elements are suitable to be mounted and clamped to the respective ends of the connection bridge, which has its ends shaped in such a manner as to ensure an indissoluble connection, which also prevents any risk of the segment accidentally coming out.

The connection bridge is advantageously made of plastic or metal material, preferably of wire, to ensure the desired elasticity and flexibility of the entire support and to allow the support to be easily coupled with the frame of the glasses, by exploiting this elasticity.

When the second attachment elements also have the function of anchoring themselves to the glasses frame, the elasticity and flexibility of the connection bridge reinforces the coupling between the support for auxiliary lenses and the frame; in fact, said attachment elements are kept constantly under tension in their position, thus preventing the connection from loosening, or any possible accidental detachment.

According to a variant, the connection bridge is made of semi-rigid metal material.

The second attachment elements, when their only function is to attach the bridge, are substantially shaped like an upside down U, and in turn have elastic means suitable to be inserted and mechanically clamped into cavities made in the lenses for this purpose, in order to ensure an enduring attachment, substantially preventing any risk of the attachment means accidentally coming out.

On the contrary, when the second attachment elements also function as a coupling between the support for auxiliary lenses and the glasses, they are substantially identical to the first attachment means.

Thanks to the elastic clamping means, it is extremely quick and easy to assemble the first and second attachment means to the relative lenses, and no auxiliary equipment or working is required.

In a variant, the attachment elements and the lenses, and the second attachment elements and the bridge, are coupled together definitively, by using adhesives.

The support for auxiliary lenses according to the invention therefore does not provide auxiliary structures of the type with a metal trunk, such as those known in the state of the art, but provides to use universal elements, which can be prepared and assembled in a very short time and at a very limited cost, and then associated with lenses cut according to the required shape. Moreover, the support does not provide either complex assembly procedures, or auxiliary elements such as screws, rivets or similar; nor does it require holes or threads to couple and attach the attachment elements to the relative lenses.

BRIEF DESCRIPTION OF THE DRAWINGS

These characteristics and advantages of the invention will become obvious from the following description of some preferential forms of embodiment, given as a non-restrictive example, with reference to the attached drawings wherein.

DETAILED DESCRIPTION OF SOME PREFERENTIAL EMBODIMENTS

Figure 1:
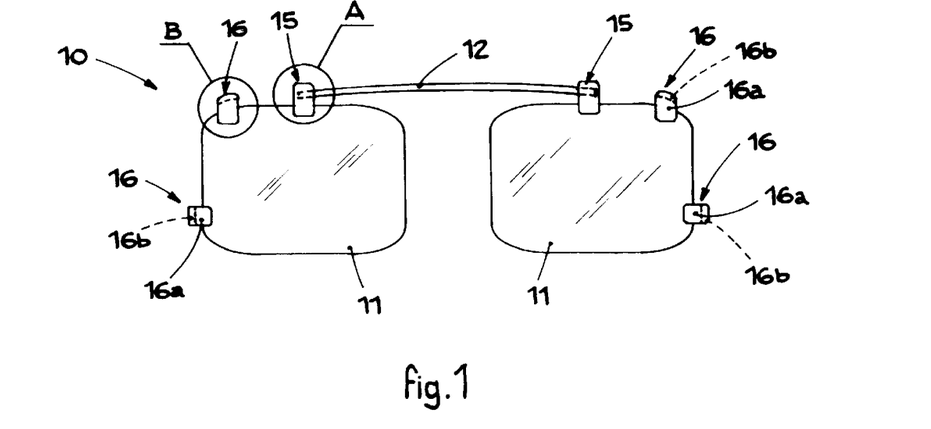
FIG. 1 is a front view of a support for auxiliary lenses according to the invention.
Figure 2:
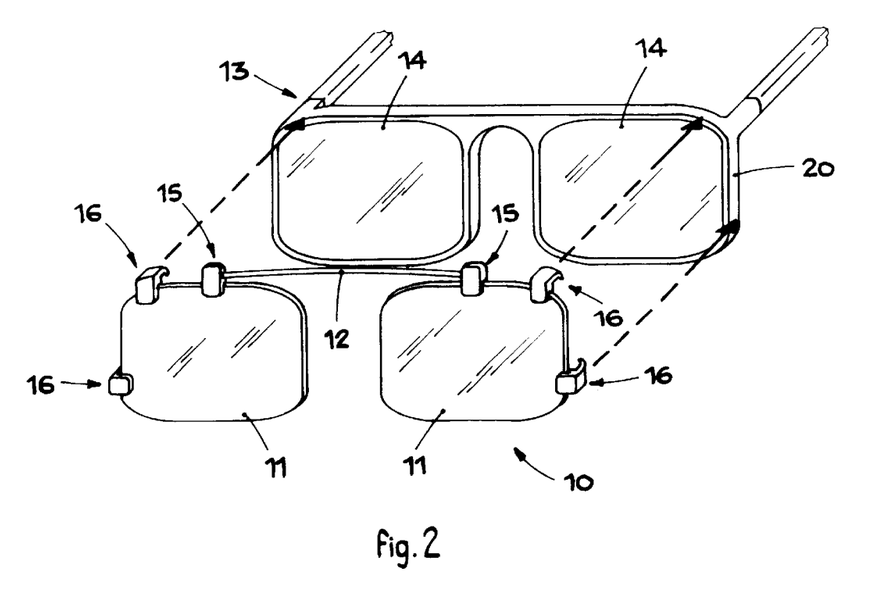
FIG. 2 is a part view of the support shown in FIG. 1 associated with a pair of glasses.
Figure 3A:
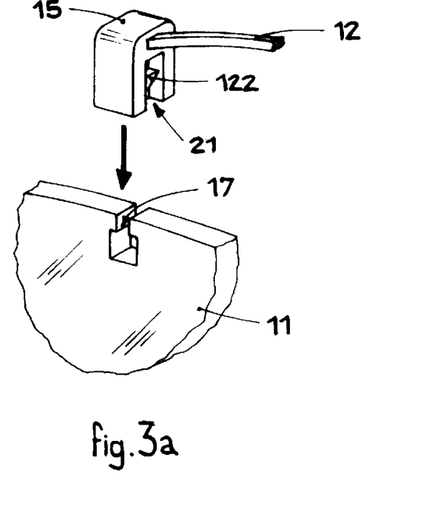
FIGS. 3a and 3b show respectively, with a prospective view, the detail A and the detail B of FIG. 1, in the disassembled condition.
Figure 3B:
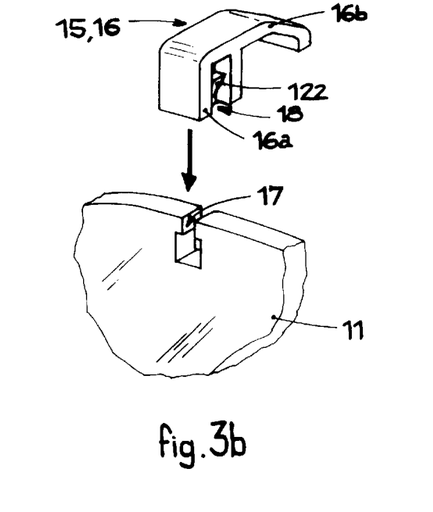

FIGS. 1 and 2 show a support 10 for auxiliary lenses 11 of the type able to be temporally attached to a pair of glasses 13 equipped with main lenses 14 associated with a frame 20. The auxiliary lenses 11 may be, for example, of the type for sun glasses, or special lenses, chromatic lenses, etc.

The support 10 and the glasses 13 are coupled, in the embodiment shown in FIGS. 1 and 2, by means of first attachment elements 16, arranged along the edge of the relative lens 11 and able to anchor themselves to said frame 20.

In this case, the support 10 has two of said first attachment elements 16 for every lens 11, respectively one on the upper edge and one on the lateral edge of the relative lens 11.

The first attachment elements 16 are made of at least partly elastic plastic material.

It is within the field and scope of the invention to provide three or more first attachment elements 16 for every lens 11.

The first attachment elements 16 comprise a segment 16a shaped substantially like an upside down U defining a cavity 18 able to be inserted and mechanically clamped, as will be seen hereafter, in a mating cavity 17 made in the relative lens 11, and a substantially horizontal extension 16b terminally shaped like a hook.

The extension 16b is able to hook onto a relative segment of the frame 20 to clamp the support 10 to the glasses 13. The support 10 also comprises a connection bridge 12 able to unite the two auxiliary lenses 11; the bridge 12 is made preferentially of metal or plastic material at least partly elastic and flexible to facilitate the operations to attach/detach the support 10 to/from the glasses 13.

At the ends of the bridge 12 respective second attachment elements 15 are associated; these are shaped substantially like an upside down U and define a cavity 21 able to cooperate with a mating cavity 17 made in the lens 11. The second attachment elements 15 are also made of at least partly elastic plastic material.

Figure 8:
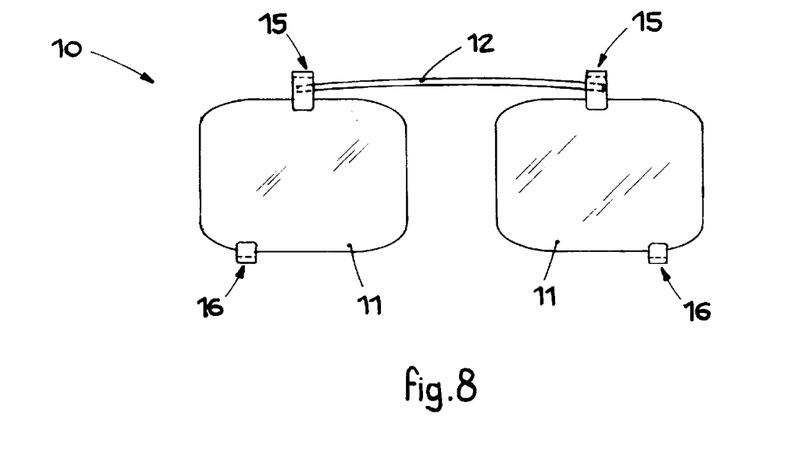
FIGS. 8 and 9 show another embodiment of the invention, respectively from the front and with a prospective view.
Figure 9:
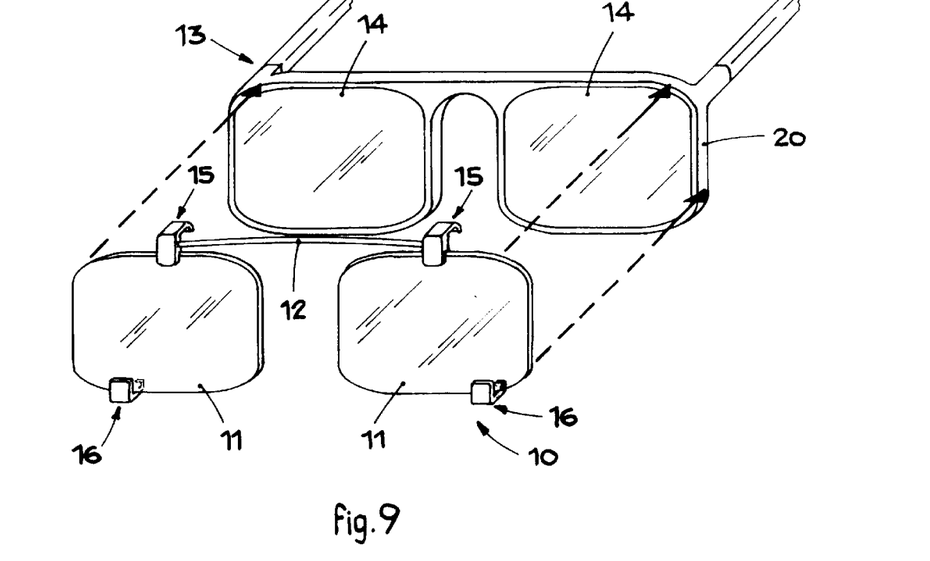

In the embodiment shown in FIGS. 8 and 9, the second attachment elements 15 not only have the function of supporting the bridge and coupling it with the auxiliary lenses 11, but also as an attachment to the frame 20 of the glasses 13. In this case, the second attachment elements 15 are substantially identical in configuration to the first attachment elements 16.

The preferential embodiment of the invention provides in this case that, for every auxiliary lens 11, the support 10 has a second attachment element 15 with the double function of supporting the bridge 12 and as an anchorage to the frame 20, and a first attachment element 16, distanced from the second attachment element 15 and arranged, for example, along the lower edge of the lens 11, towards the outside thereof.

Using the second attachment elements 15 also as an anchorage to the frame 20 not only further reduces the number of pieces needed to produce the support 10, but also increases the stability of the coupling of the support 10 to the frame 20. In fact, the flexibility and elasticity of the bridge 12, exerting an action of elastic thrust against the respective attachment elements 15, keeps them under tension in their position, and hence prevents them from loosening and relaxing.

Inside the respective cavities 18 and 21, the first 16 and second 15 attachment elements have elastic mechanical attachment means 22 able to be clamped inside the cavities 17 of the lenses 11; the cavities 17 in turn have a shaped conformation such as to ensure a stable anchorage which does not require further auxiliary elements, such as screws or suchlike.

Figure 7:
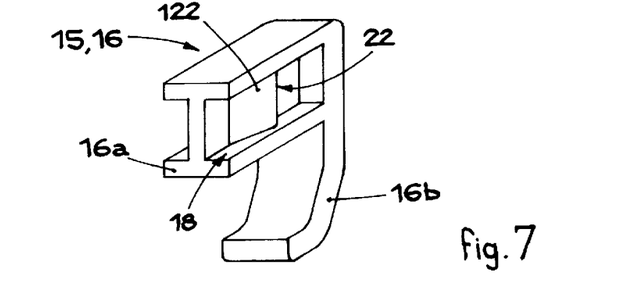
FIG. 7 is a prospective view of the attachment elements according to the invention.

In the solution shown in FIG. 7, the elastic attachment means 22 consist of fins 122 able to cooperate with the substantially T-shaped conformation of the cavity 17. By exploiting the elasticity of the material, the fins 22 are forced inside the T-shaped cavities 17, partly deforming and clamping themselves inside, in a stable manner so that they cannot accidentally come out.

Figure 5A:
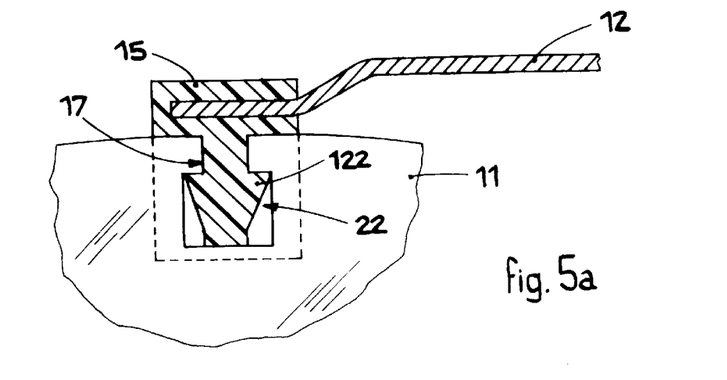
FIGS. 5a–5c show in section, from the side, three embodiments of the detail of the coupling of the bridge and the second attachment elements.
Figure 5B:
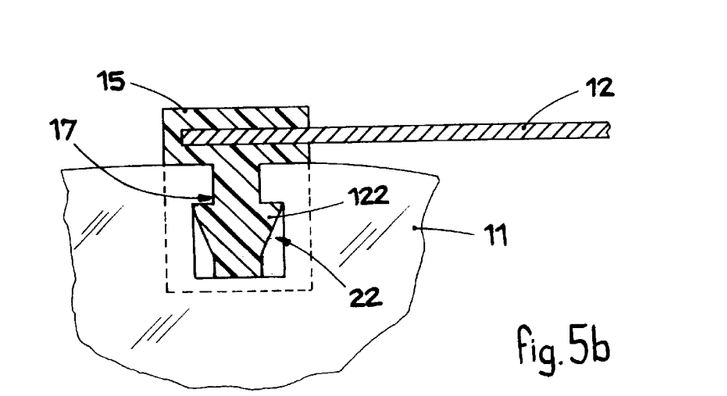
Figure 5C:
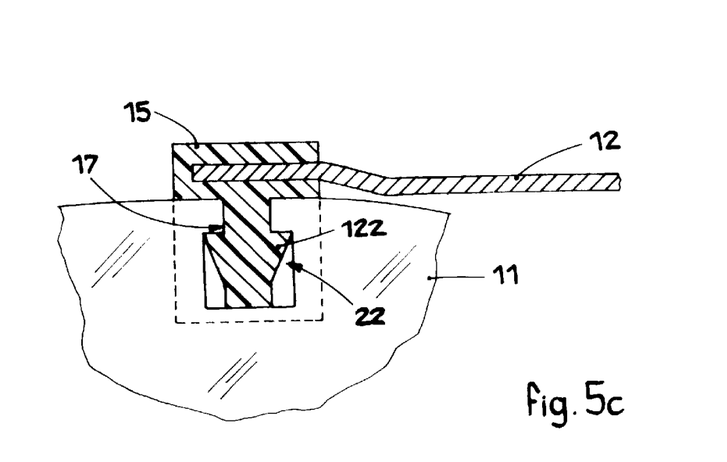

On this point please see FIGS. 5a–5c too.

It is obvious that instead of the T shape, the cavities 17 can be of other shapes, and some examples are shown in FIGS. 6a–6g.

Figure 6A:
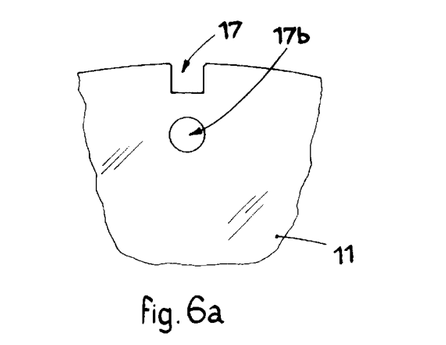
FIGS. 6a–6g show six embodiments of the cavities made in the auxiliary lenses to couple with the respective attachment elements.
Figure 6B:
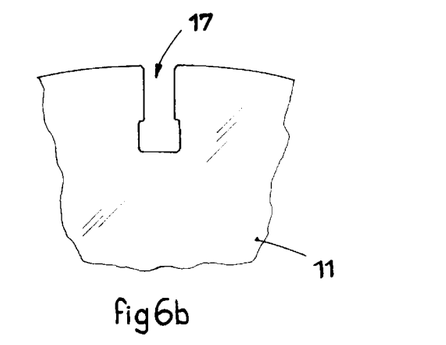
Figure 6C:
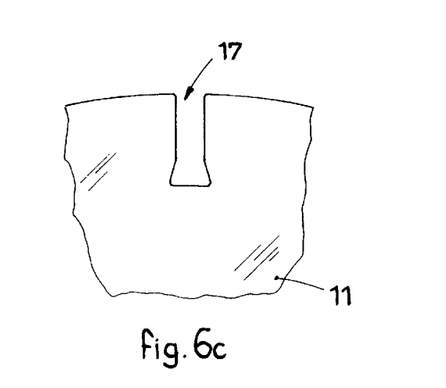
Figure 6D:
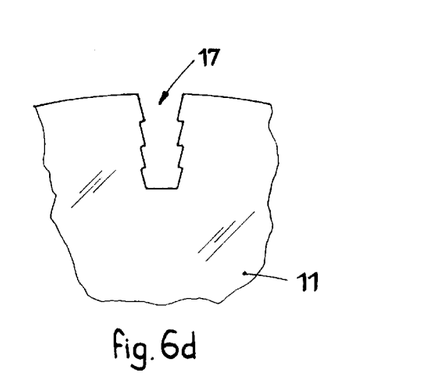
Figure 6E:
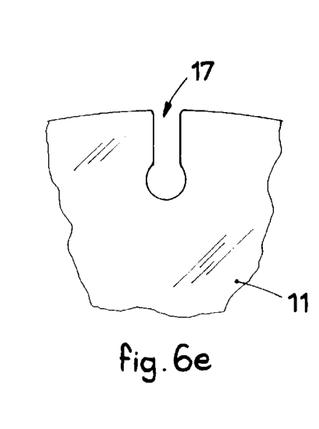
Figure 6F:
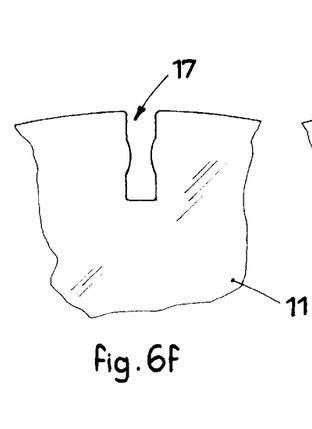
Figure 6G:
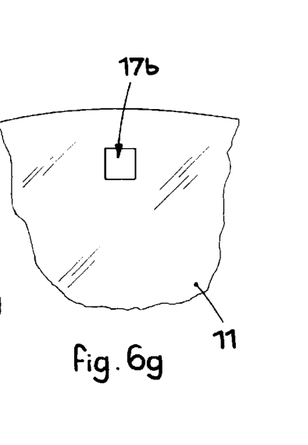

The cavities 17 shown in FIG. 6a and FIG. 6g have a hole 17b which allows a pin element or similar, which is included on the attachment element 15, to be inserted; in FIG. 6a the hole 17b is round and is associated with a lead-in hollow, whereas in FIG. 6g the hole is square; the cavity 17 shown in FIG. 6b has a step-like enlargement at the bottom, whereas the cavity 17 shown in FIG. 6c has a gradual enlargement; the cavity 17 shown in FIG. 6d has lateral knurls, the cavity 17 shown in FIG. 6e has a circular enlargement at the bottom while the cavity 17 shown in FIG. 6f has an intermediate narrowing of section.

It is also obvious that for every different shape of the cavities 17 the elastic means 22 will have a mating shape so that they can be inserted and mechanically clamped inside thereof.

To ensure a substantially indissoluble mechanical anchorage, suitable to prevent accidental detachment, the bridge element 12 has its respective ends equipped with an anti-detachment shape cooperating with the respective second attachment element 15.

Figure 4A:
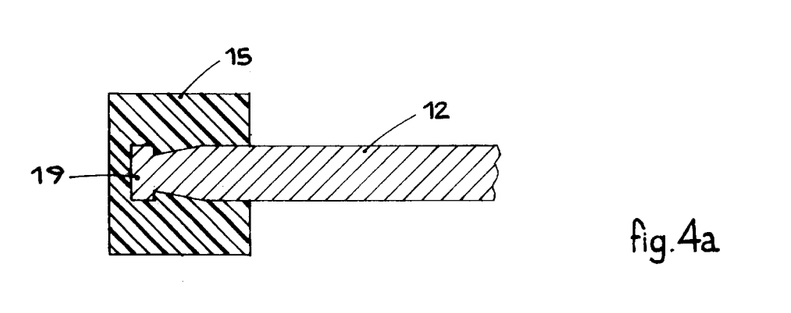
FIGS 4a–4c show in section, from above, three embodiments of the detail of the coupling of the bridge and the second attachment elements.
Figure 4B:
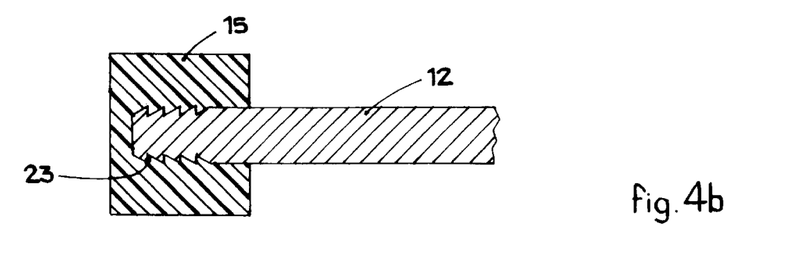
Figure 4C:
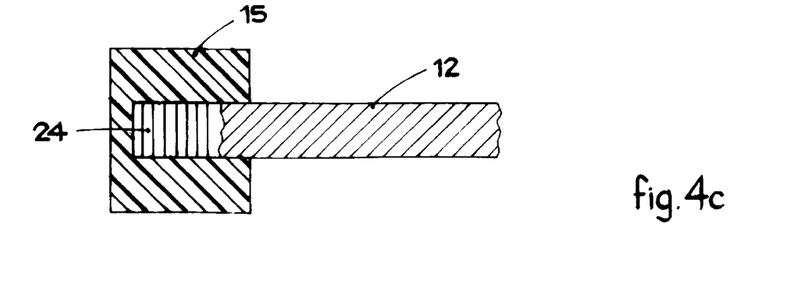

Examples of these shapes are shown in FIGS. 4a–4c.

In FIG. 4a, the end of the bridge 12 is substantially shaped like a T 19.

By exploiting the elastic deformability of the material which constitutes the second attachment element 15, the T-shaped end of the bridge 12 can be inserted into a mating seating made for this purpose in the base thickness of said element 15; once it has been inserted, it is substantially impossible for the end to emerge, thanks to the T-shaped coupling.

In the embodiment shown in FIG. 4b, at its end the bridge 12 has knurls 23 made laterally, while in the embodiment shown in FIG. 4c it has knurls 24 made on the upper part; the knurls are suitably oriented forwards so as to allow insertion but to mechanically prevent extraction once the coupling is achieved.

The shaping of the terminal segment of the bridge 12 may be straight, as in FIG. 5b, or slightly curving downwards (FIG. 5a) or upwards (FIG. 5c), both for aesthetic reasons, for example to distance the bridge 12 from or bring it nearer to the lenses 11, and also to further reinforce the coupling between the bridge 12 and the second attachment elements 15.

To achieve the support 10 it is therefore sufficient to cut the auxiliary lenses 11 to size, according to the desired shape, and then to mechanically apply thereto the first attachment elements 16 and the bridge 12 by means of the relative second attachment elements 15.

The elements 12, 15 and 16 can be of the substantially universal type, and the assembly procedures are extremely simple, quick and economical; consequently, the support 10 can be produced in a very short time, with limited costs and therefore also for extremely limited and personalized quantities.

Obviously, modifications and variants may be made to the invention, but these shall remain within the field and scope of the invention as defined by the attached claims.

What is claimed is:

1. An auxiliary lens support for temporarily associating a pair of auxiliary lenses in removable fashion with a frame supporting a pair of main lenses, comprising:
    at least one first attachment element and at least one second attachment element for each of the auxiliary lenses, one of the at least one first attachment elements and one of the at least one second attachment elements being spaced a distance along a periphery of the auxiliary lens;
    the first attachment element and the second attachment element each comprising at least one segment shaped substantially like an inverted U and having elastic means for mechanically coupling with a respective auxiliary lens; and
    the at least one first attachment element also comprising a hook-shaped extension hook for anchoring each of the auxiliary lenses to the frame.

2. The support of claim 1, comprising two of the first attachment elements arranged spaced from each other along the periphery of the respective auxiliary lens.

3. The support of claim 1, further comprising a bridge for uniting the auxiliary lenses, the bridge having two end portions, and the bridge being connected to the respective auxiliary lenses by the respective second attachment elements.

4. The support of claim 3, wherein the at least one second attachment element comprises a hook-shaped extension for anchoring the auxiliary lenses to the frame.

5. The support of claim 3, wherein the end portions of the bridge are curved downward.

6. The support of claim 3, wherein the end portions of the bridge are curved upward.

7. The support of claim 1, wherein at least one first attachment element or at least one second attachment element is arranged on an upper edge of the respective auxiliary lens and at least one first attachment element is arranged on a lateral or lower edge of the respective auxiliary lens.

8. The support of claim 1, wherein the segment shaped substantially like an inverted U defines a cavity for receiving the elastic means, the elastic means being inserted and clamped by mechanical interference into a mating cavity located in a corresponding position on the respective auxiliary lens.

9. The support of claim 8, wherein the elastic means comprises elastic fin means for partly deforming and clamping inside the cavities of the respective auxiliary lens.

10. The support of claim 8, wherein the cavities for receiving the elastic means have an anti-detachment shape for mating with the shape of the elastic means.

11. The support of claim 10, wherein the anti-detachment shape is T-shaped.

12. The support of claim 10 wherein the anti-detachment shape comprises at least one enlarged portion at the base of the cavity.

13. The support of claim 10, wherein the anti-detachment shape comprises at least one reduction in an intermediate section of the cavity.

14. The support of claim 3, wherein the connection bridge is made of at least partly elastic and flexible material.

15. The support of claims 14, wherein the connection bridge exerts on the respective second attachment elements, an elastic thrust for keeping the second attachment elements under tension when in an anchoring position relative to the frame.

16. The support of claim 3, wherein the connection bridge exerts on the respective second attachment elements, an elastic thrust for keeping the second attachment elements under tension when in an anchoring position relative to the frame.

17. The support of claim 3, wherein the two end portions of the connection bridge have an anti-detachment shape for cooperating with a corresponding mating seating made in the respective second attachment elements.

18. The support of claim 17, wherein the anti-detachment shape is a substantially T-shaped.

19. The support of claim 17, wherein the anti-detachment shape is defined by knurls on the ends of the bridge.

* * * * *

UNITED STATES PATENT AND TRADEMARK OFFICE
CERTIFICATE OF CORRECTION

PATENT NO.    : 6,354,702 B2  
DATED         : March 12, 2002  
INVENTOR(S)   : Gianmarco Da Via'

It is certified that error appears in the above-identified patent and that said Letters Patent is hereby corrected as shown below:

<u>Title page,</u>
Item [12], "Via'" should read -- Da Via' --.
Item [76], Inventor, "Cardore" should read -- Cadore --.

Signed and Sealed this

Eighteenth Day of February, 2003

JAMES E. ROGAN
*Director of the United States Patent and Trademark Office*